United States Patent

[11] 3,566,090

| [72] | Inventor | Ronald W. Johnson |
| | | Cherry Hill, N.J. |
| [21] | Appl. No. | 778,605 |
| [22] | Filed | Nov. 25, 1968 |
| [45] | Patented | Feb. 23, 1971 |
| [73] | Assignee | Ultronic Systems Corporation |

[54] APPARATUS FOR CONTROLLING THE RATE OF TRANSFER OF INFORMATION
3 Claims, 1 Drawing Fig.

[52] U.S. Cl. ................................................. 235/92,
340/172.5, 340/154
[51] Int. Cl. .................................................. H03k 21/36
[50] Field of Search ........................................ 340/154,
172.5; 235/92

[56] References Cited
UNITED STATES PATENTS
| 3,413,452 | 11/1968 | Schlein | 235/92 |
| 3,462,739 | 8/1969 | Scantlin | 340/154 |
| 3,348,209 | 10/1967 | Brooks | 340/172.5 |

Primary Examiner—Maynard R. Wilbur
Assistant Examiner—Robert F. Gnuse
Attorneys—Norman J. O'Malley and Theodore C. Jay, Jr.

ABSTRACT: Apparatus for controlling the rate at which information is transferred from the output of a multistage storage register in accordance with the rate at which information is supplied to the input of the register. A pulse generator supplies a first pulse train of equidistantly spaced pulses of like amplitude and duration to a "divide by N" counter where N is a variable integer. The output of the counter yields a second pulse train of variable recurrence frequency which is used to control the information transfer rate from the output of the register. The rate at which information is supplied to the input of the register varies, thus varying the amount of information stored in the register. A logic circuit is interposed between the buffer and the counter to vary the value of N in accordance with the changes in the amount of information stored in the register in such manner that the average rate at which information is transferred from the output of the register is always equal to the average rate at which information is supplied to the input of the register.

PATENTED FEB 23 1971 3,566,090
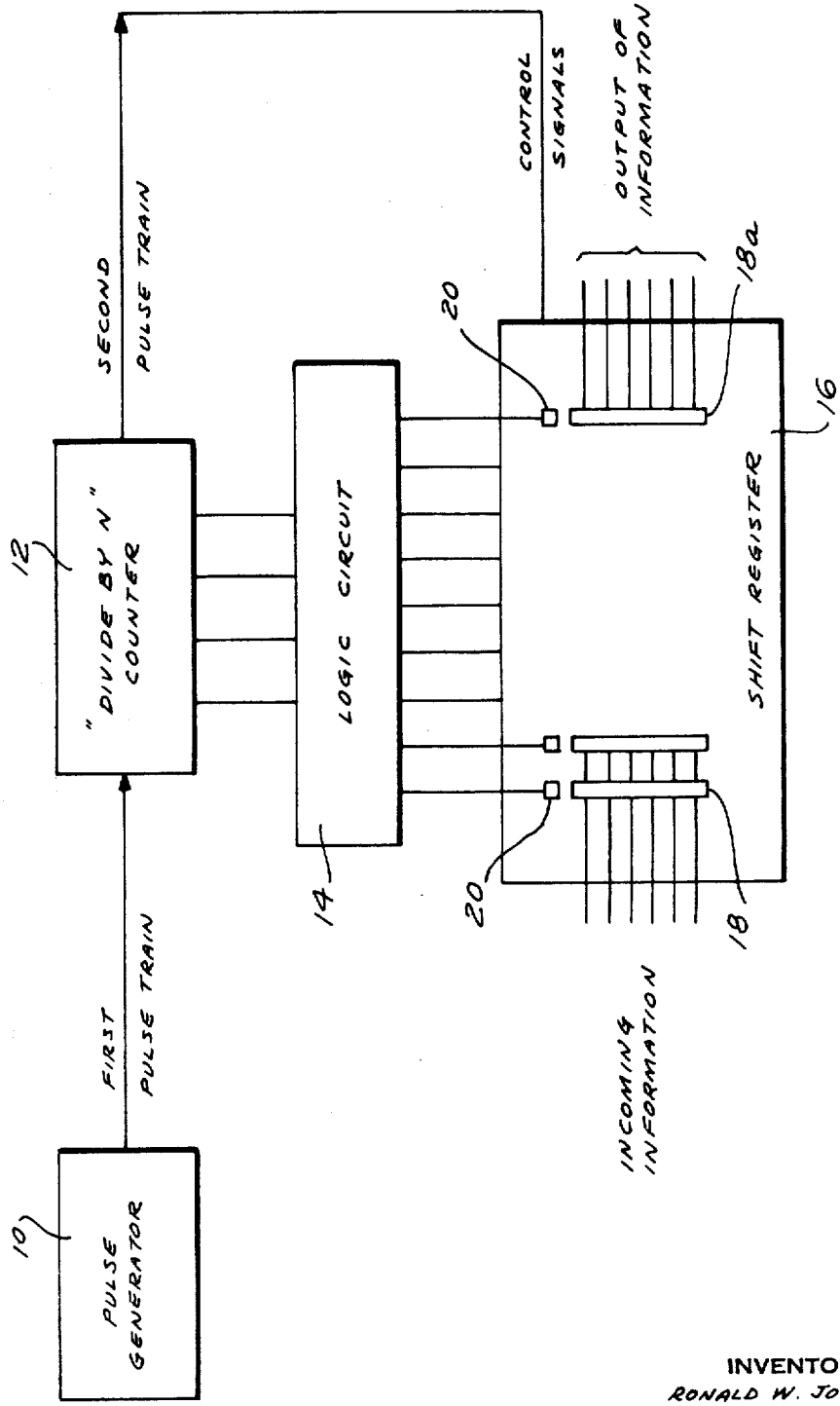
INVENTOR
RONALD W. JOHNSON
BY Theodore Jay Jr.
ATTORNEY

3,566,090

APPARATUS FOR CONTROLLING THE RATE OF TRANSFER OF INFORMATION

BACKGROUND OF THE INVENTION

Various systems used in the securities and exchange markets are adapted to receive transaction information from ticker lines in the form of electrical equivalents of alpha-numeric characters and to display these characters in the form of an apparently moving display. The information on the ticker input lines characteristically exhibit sudden starts and stops. Viewers of the moving display find such starts and stops to be uncomfortable to the eye. As a result, moving displays are designed in such manner that the displayed information appears to accelerate or decelerate linearly as the information on the ticker lines starts and stops.

A multistage register can be interposed between the ticker lines and the display to provide temporary storage of information received on the ticker lines and not yet displayed, and thus enable the display to function as described. The rates at which information is supplied to and transferred from the device are variable and can differ from each other over short time intervals, providing that the average rate at which information is supplied to the register must equal the average rate at which information is transferred from the register. (If the average rates differ, the acceleration and deceleration will ensue improperly in a nonlinear manner.) The rate at which information is supplied to the input of the register is determined by the actual transactions occurring in the market and cannot be controlled by my apparatus. It is therefore necessary to regulate the rate at which information is transferred from the register.

I have invented apparatus which provides this regulation in a unique manner through the use of digital control techniques.

SUMMARY OF THE INVENTION

In accordance with the principles of my invention, I provide a multistage register which receives incoming information at a variable rate which is subject to sudden starts and stops. The incoming information is shifted through each stage of the register in turn until it arrives at the final or output stage. Information can only be transferred out of the final stage when a control pulse is supplied thereto.

A pulse generator producing a first train of equidistantly spaced pulses of like amplitude and duration supplies this first train to the input of a "divide by N" counter, where N is a variable integer. The output of the counter yields a second pulse train of control pulses having a recurrence frequency which is varied in accordance with the variations in the value of N. These control pulses are supplied to the output stage of the register to initiate the transfer of information therefrom.

The value of N in the counter is varied and causes corresponding variations of the recurrence frequency of the second pulse train. To this end, a logic circuit is interposed between the register and the counter to vary the value of N in accordance with the amount of information stored in the register whereby as the register fills up, the rate of transfer of information of the register increases and as the register empties, the rate of transfer decreases.

More particularly, each stage of the register is provided with means for indicating whether or not information is stored therein. The logic circuit is coupled at its input to all of said means and produces at its output a signal which is determined by the number of stages containing stored information and which varies as this number changes. This signal is supplied to the counter to set the value of N and, as the signal varies, the value of N is varied accordingly.

The net result is that the rate of transfer of information out of the register is varied automatically to obtain smooth information flow without inserting or deleting information.

BRIEF DESCRIPTION OF THE DRAWINGS

The accompanying FIG. is a block diagram of my invention.

DETAILED DESCRIPTION OF PREFERRED EMBODIMENTS

Referring now to the accompanying FIG., a pulse generator 10 produces a first pulse train of positive going identical rectangular pulses at a first fixed recurrence frequency. This first train is supplied to the input of a "divide by N" counter 12. Counter 12 yields at its output a second pulse train of positive going identical rectangular pulses at a second recurrence frequency which is variable and changes with changes in the value of N. N is an integer and can take any integral value between one and ten.

The value of N is determined by a control signal supplied to the counter 12 by a logic circuit 14.

Information representing characters such as numbers or letters expressed in a binary code such as a standard teletype code are supplied in bit-parallel, series-character form to the input of a shift register 16. This register contains a plurality of stages 18. Information is shifted in bit-parallel, series-character form under the control clock pulses through each stage of the register in turn until it arrives at a stage immediately preceding a filled stage. Initially, if all stages are empty, the information is automatically shifted from stage to stage until it arrives at the final or output stage 18A.

Information can only be transferred out of this last stage, for example to a display device, when a control pulse is supplied thereto. If the final stage contains untransferred information and new information arrives at the input of the register before information is transferred out of the final stage, the new information is automatically shifted from the input into the next to the last stage. This process can continue until all stages are filled. The control pulses are constituted by the second pulse train and are supplied via the output of counter 12.

Each stage 18 or 18A has associated therewith a corresponding data-available flip-flop 20. When any stage has information stored therein, the corresponding flip-flop is in a selected one of its two electric states. When the stage is empty, its flip-flop is in the other of its states.

Logic circuit 14 is connected at its input to all of the data-available flip-flops and produces at its output the control signal used to control the value of N. This signal varies as the number of flip-flops indicating stages with information stored therein vary. Stated differently, if the number of stages is A, where A is an integer, this signal can attain any one of A different values.

Therefore, as the register content of information varies between full and empty, the recurrence frequency of the control pulses varies to speed up and slow down the rate of information transfer with results as previously described. The timing of control pulses with respect to the clock pulses controlling shifting between stages in the register is such that new information cannot arrive at the input of a completely filled register; there will be at least one empty stage. A register which can be used in the manner described herein is shown and described in more detail in the copending application of W. P. Rogers, Ser. No. 772,480, now Pat. No. 3,521,245, filed Nov. 1, 1968 for Information Storage Device and assigned to the assignee of the present application.

A typical "divide by N" counter is type CCSL manufactured by Fairchild Semiconductor. This counter has four control terminals which, when binary zeros or ones are applied thereto, determine the value of N in accordance with a code.

The logic circuit must then have four output leads, each of which is connected to a corresponding terminal. A typical register can have for example nine stages and thus the logic circuit can have nine input loads, each of which is connected to a corresponding data-available flip-flop.

A table below shows a code for converting the filled or empty condition of the register into a control for the counter.

TABLE

| REGISTER | LOGIC CIRCUIT OUTPUT |
|---|---|
| Stage 9 Filled | 1000 |
| Stage 8 Filled | 1100 |
| Stage 7 Filled | 0110 |
| Stage 6 Filled | 1011 |
| Stage 5 Filled | 1101 |
| Stage 4 Filled | 1110 |
| Stage 3 Filled | 0111 |
| Stage 2 Filled | 0011 |
| Stage 1 Filled | 0101 |

While I described my invention with particular reference to preferred embodiments, my protection is to be limited only by the claims which follow.

I claim:

1. Apparatus for controlling the rate of transfer of information out of the last stage of a multistage register which receives incoming information at a variable rate, said register having A different stages where A is an integer, each stage having an associated device for indicating whether the corresponding stage is either filled with information or is empty, said apparatus comprising:

a pulse generator for producing a first pulse train at a fixed recurrence frequency;

a "divide by N" counter, where N is a variable integer, said counter receiving said first pulse train at its input and yielding at its output a second pulse train of variable recurrence frequency;

means to supply said second train to said register, each second train pulse initiating the transfer of information out of said last stage;

means coupled to each of said devices in the register and responsive to the number of filled stages therein to produce a digital control signal which varies with changes in the number of filled stages, said digital signal attaining any one of A different values; and means to supply said digital signal to said counter to determine the value of N in such manner that the average rate of transfer of information out of the register is always equal to the average rate at which information is supplied to the input of the register.

2. Apparatus as set forth in claim 1 wherein each device is a flip-flop which is in a selected one of its two electric states when its corresponding stage is filled and is in the other of said states when the corresponding stage is empty.

3. Apparatus as set forth in claim 1 wherein said responsive means is a logic circuit.